United States Patent [19]

Lieber et al.

[11] Patent Number: 5,011,259
[45] Date of Patent: Apr. 30, 1991

[54] METHOD FOR ALIGNING TWO WAVEGUIDE FIBER ENDS AND AN APPARATUS FOR PERFORMING THE METHOD

[75] Inventors: Winfried Lieber, Kaiserslautern; Thomas Eder, Krailling, both of Fed. Rep. of Germany

[73] Assignee: Siemens Aktiengesellschaft, Berlin and Munich, Fed. Rep. of Germany

[21] Appl. No.: 532,653

[22] Filed: Jun. 4, 1990

[30] Foreign Application Priority Data

Jun. 2, 1989 [DE] Fed. Rep. of Germany ....... 3918089

[51] Int. Cl.$^5$ ............................ G02B 6/00; G02B 6/26
[52] U.S. Cl. ................................. 350/96.21; 350/96.20
[58] Field of Search ........................... 350/96.20-96.22

[56] References Cited

U.S. PATENT DOCUMENTS

| | | | |
|---|---|---|---|
| 4,452,506 | 6/1984 | Reeve et al. | 350/96.20 |
| 4,474,469 | 10/1984 | Abe | 350/96.21 X |
| 4,506,947 | 3/1985 | Tatekura et al. | 350/96.21 |
| 4,810,054 | 3/1989 | Shinbori et al. | 350/96.21 |
| 4,911,522 | 3/1990 | Iwamoto et al. | 350/96.21 |
| 4,911,524 | 3/1990 | Itoh et al. | 350/96.21 |

Primary Examiner—Akm Ullah
Attorney, Agent, or Firm—Hill, Van Santen, Steadman & Simpson

[57] ABSTRACT

A method for the true alignment of two fiber ends, wherein the fiber ends are illuminated and, thus, generate a picture of the fiber ends, which is scanned with a picture sensor of a video camera.

19 Claims, 4 Drawing Sheets

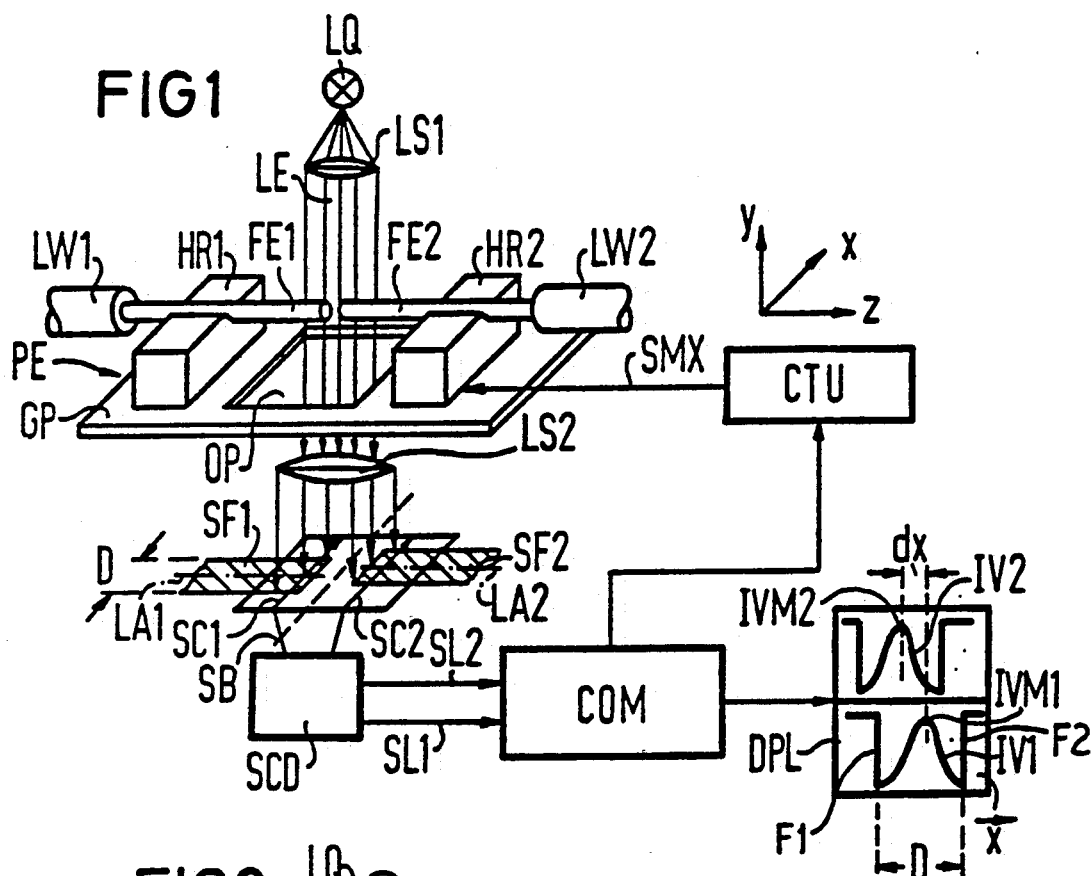
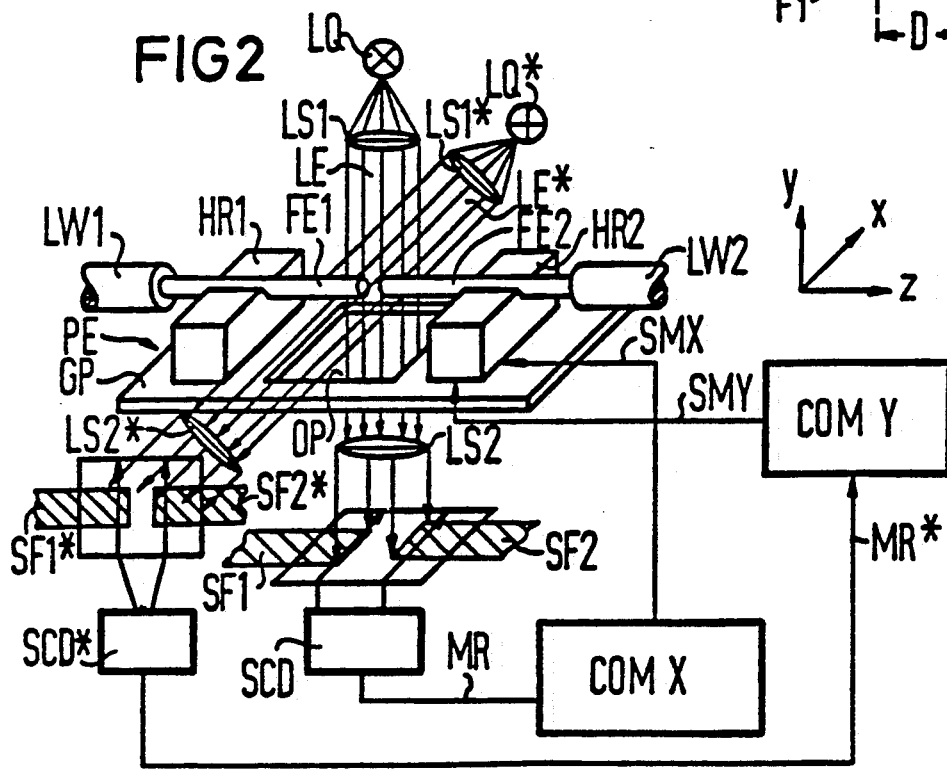

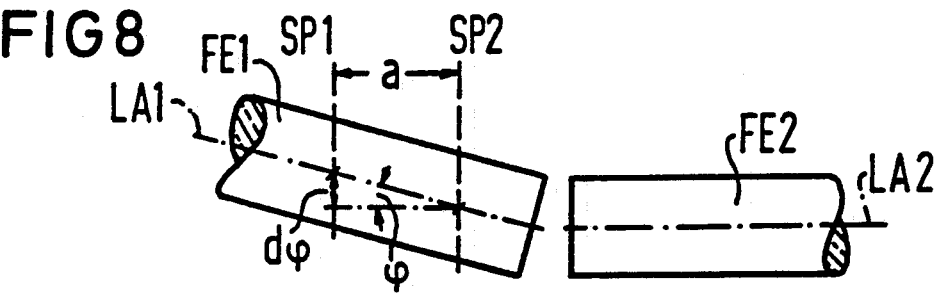
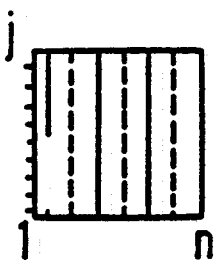
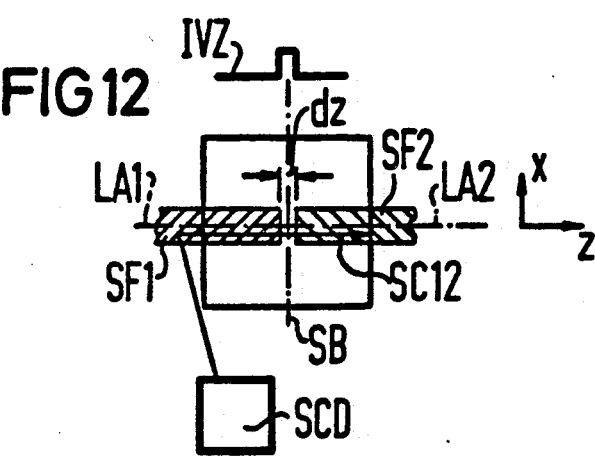

METHOD FOR ALIGNING TWO WAVEGUIDE FIBER ENDS AND AN APPARATUS FOR PERFORMING THE METHOD

BACKGROUND OF THE INVENTION

The present invention is directed to a method for the true alignment of two fiber ends, wherein the fiber ends are illuminated to create a picture of the fiber ends, which picture is scanned with a picture-video sensor of a video camera.

U.S. Pat. No. 4,506,947, whose disclosure is incorporated herein by reference thereto, discloses a method for alignment of cores of optical fibers, wherein ultraviolet light is guided onto the two fiber ends of the light waveguides. The area of irregularity is contemplated via the optical lenses in two directions proceeding perpendicular relative to one another by means of a video camera and, thus, the obtained picture of the position of the fiber ends is displayed on a video screen. The operator can perform a true alignment by actuating the corresponding manipulators. The fiber core, which, due to the fluorescing light, pictures itself on the video screen differently from the fiber cover or cladding, serves as a basis for determining the position. A disadvantage of this method is that the contrast of the fiber core compared to the fiber cover is very low and can only be improved by an unproportionally greater effort regarding the imaging device. Such devices are applicable during manufacturing. However, because a device used in the field must have a small size, must be light-weight and must have a cost-saving design, this method and device is not presently usable out in the field. The very expensive imaging systems and the high resolution camera systems of this system cannot be justified in this context.

U.S. Pat. No. 4,452,506, whose disclosure is incorporated herein by reference thereto and which claims priority from the same British Patent Application as European Patent Specification B1 00 30 108, discloses alignment equipment for positioning two light waveguide ends wherein a test light is guided into one of the light waveguide ends on which not all is guided further in the core, given a complete, exact alignment of the two light waveguide ends. A portion of the light, then, will proceed outside in a parallel fashion to the longitudinal axis along the second light waveguide. For the detection of this portion of the outside proceeding light that is proportional to the misalignment between the waveguides, an arrangement of four sector-shaped photosensitive elements are provided in a plane extending transverse relative to the longitudinal axis of the light waveguide. These light-sensitive elements are allocated to corresponding evaluation circuits. Based on the measuring signals originating from the individual sectors, the size and the direction of the misalignment is determined and a post adjustment by means of corresponding adjustment elements is enabled. The disadvantage of such an arrangement is, above all, that the light-sensitive, sector-shaped elements must first be mounted or plugged onto the beam waveguide. For an optimally accurate measurement, however, a sliding position of the light-sensitive elements would actually be necessary, since every lateral play of these elements expresses itself in a measuring error. Furthermore, another disadvantage is that only the tips of the sectors lie in the area of the cover of the beam waveguides and the least amount of light is accepted there. This means that the sensitivity of the arrangement increasingly decreases with a decreasing misalignment so that a fine alignment of the ends can only be performed in relatively inaccurate fashions.

In a copending U.S. patent application, Ser. No. 755,276, which was filed on July 15, 1985 and claims priority from German Application No. 34 29 947, a measuring arrangement is disclosed. It is a prerequisite in this measuring method that light from the measuring emitter/waveform generator is coupled into a core of a light waveguide directly before the splicing location. Normally, this is achieved in that this beam waveguide is given a definite curvature, whereby behind the splicing location, likewise taking advantage of this bending method, the outcoupling of a portion of the light signal guided via the irregular location of the light of the fiber occurs. The application of such a coupling method in the form of bent waveguides is limited, but not possible, for example in the case of fibers that are barely sensitive to bending and curving, in which case the fiber with a special primary coating, for example a hermetically coated fiber, and always, then, when the fiber is not freely accessible, for example in the case of preconnected cables, so-called pigtails and in the case of particularly small projection lengths.

SUMMARY OF THE INVENTION

The present invention is based on the object of creating an alignment of two fiber ends by observing the point of separation which permits, in a particular simple manner, a recognition of the misalignment and which enables an achievement of relatively high accuracy, given the presence of disturbance variables.

According to the invention, this problems is solved in the case of an improvement in a method for the true alignment of two fiber ends, wherein the fiber ends are illuminated and, thus, generate a picture of the fiber end, which picture is scanned with a picture sensor of a video camera. The improvements are that the illumination is performed so that the fiber ends act as cylinder lenses and, thus, a maximum of intensity is created by a center of the fiber. The intensity distribution is determined separately for the imaging of each fiber end and in that, from this intensity distribution, the position of the respective longitudinal axis of the fiber and the mutual lateral offset of both fiber ends are determined, whereby a post-adjustment for a true alignment of the fiber ends will be performed.

Due to the use of the fiber ends as cylinder lenses, it is not necessary to search for the little contrasting fiber core and to image it. Neither is a specific ultraviolet light necessary. The two intensity distribution representing relatively accurately the position of the longitudinal axes of the two fibers.

In addition, the invention involves a device for the implementation of the above-described method which is characterized in that the light equipment is provided with a direct white light on the fiber ends, a scanning device is provided for performing a scanning in columns and in rows transversely relative to the longitudinal axis of the fiber ends, a storage device is provided in which at least one intensity distribution is separately recorded for each fiber end and in that the storage device is connected with a display and/or a calculating device in which the comparison of the intensity distributions are obtained.

Other advantages and features of the invention will be readily apparent from the following description of the preferred embodiments, the drawings and claims.

BRIEF DESCRIPTION OF THE DRAWINGS

FIG. 1 is a perspective view of a schematic illustration of a basic structure of the device for implementing the method according to the present invention;

FIG. 2 is a perspective view of a modified device which serves for performing an alignment of the fiber ends in two planes;

FIG. 8 is an enlarged side view of a pair of fiber ends illustrating the procedure for determining angle error during the alignment of the fiber ends;

FIG. 10 is a graph showing a video signal in analog and scanned signal sequence;

FIG. 11 is a graph showing the distribution of fields given a scanning of the fiber ends in columns; and FIG. 12 is a schematic illustration of the scanning in the direction of a longitudinal axis of the fiber.

DESCRIPTION OF THE PREFERRED EMBODIMENTS

Figure 3:
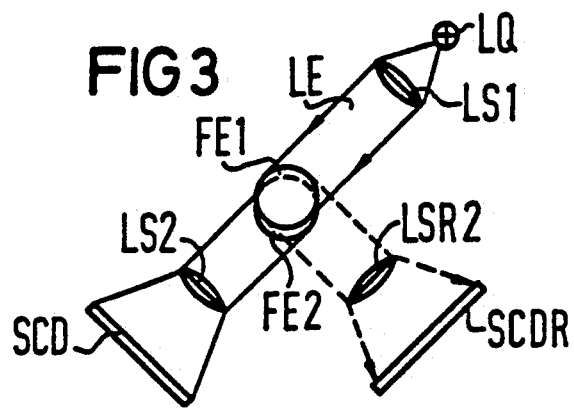
FIG. 3 is a schematic illustration of an arrangement for operating with both a throughgoing and reflected light.

The principles of the present invention are particularly useful when incorporated in a device illustrated in FIG. 1.

In the device of FIG. 1, two light waveguides LW1 and LW2, which are to be connected with one another, for example by welding, are shown. In the end region, the coating of the light waveguides has been removed and the uncoated fiber ends FE1 and FE2 are held in corresponding holding equipments HR1 and HR2 of a known device, for example manipulators. These holding devices HR1 and HR2 are arranged on a common base plate GP, whereby at least one of the holding devices, represented by the device HR2, is fashioned to be in a displaceable fashion in response to corresponding signals on a control line SMX from a corresponding control element CTU. As illustrated, the device HR2 will be movable in at lest one direction, which is illustrated as being transverse relative to a longitudinal axis of the fiber.

In the present example, it is assumed that the movement in all three directions, namely an direction, which is a transverse direction parallel to the surface of the plate GP; a y direction, which is a vertical or perpendicular direction to the plate GP; and a z direction, which is parallel to the longitudinal axes of the optical fibers, is possible. A light source LQ with a white light; particularly either a halogen lamp, a luminous diode or a laser, creates a light beam LE which is guided onto the fiber ends FE1 and FE2 by means of a lens LS1 to produce a shadow image of the two ends FE1 and FE2. Thus, the light passing the ends FE1 and FE2 will be focussed by a lens LS2 in a focal plane with the shadows SF1 and SF2 of the ends FE1 and FE2. This focal plane is scanned in rows, namely, respectively, in a direction extending transverse relative to the longitudinal axes LA1 and LA2 of the fibers, in the x direction. The scanning event is schematically indicated by the arrows SC1 and SC2, which, respectively, proceed in parallel fashion to the line SB, which corresponds to a bisecting line which extends in the x direction and is an axis of symmetry of the entire arrangement and marks the exact target splicing location of the end faces of the fiber ends FE1 and FE2. The scanning in rows corresponding to the arrows SC1 and SC2 is performed incremental in a radial direction, i.e., in the x direction so that, for each of the fiber ends FE1 and FE2, an intensity distribution in the direction of the x axis is obtained from the scanning device SCD.

Expediently, the scanning is performed in direct proximity of the fiber separating location, that is at the face ends SF1 and SF2. In so doing, misalignment due to angle errors due to distortions in the optical device and/or dirt in the grooves or on the fiber in the area of the holding devices HR1 and HR2 are prevented.

Multiple scanning at various z positions and subsequent formation of an average value can be used for an improved suppression of optical disturbing variations, such as local defects; for example dirt, or from electrical-disturbing variables.

Multiple scanning, given a constant position along the z axis and subsequent formation of the average value suppresses electrical-disturbing variables and is, therefore, likewise, to be considered as useful, as is the above-mentioned described case. In any case, for each shadow picture SF1 and SF2, at least one scanning event along the x direction is necessary.

An evaluation and computing device COM receives separate intensity information through lines SL1 and SL2, which can be linked to one another in a separate fashion corresponding to the arrows SC1 and SC2 so that separate displays on a corresponding display unit DPL are possible. As schematically indicated, the two intensity distributions IV1 and IV2 have an offset dx in the x direction, which corresponds to the mispositioning or misalignment and which is to be rendered or moved to zero at the end of the positioning event, i.e., shortly before the welding of the light waveguide ends FE1 and FE2, together.

In the following, the intensity distribution is explained in more detail with the curve IV1. Outside of the shadow area SF1, for example outside of the diameter region D of the fiber end FE1, the intensity IV1 is high because the light from the light source LQ can be scanned here in its completely unimpeded fashion. As soon as the outer edge of the shadow image SF1 is reached, the intensity distribution drops very significantly, namely in a relatively abrupt fashion, as shown by a flank F1. Across the entire area D covered by the shadowing, the intensity IV1 does not remain constant, but it reaches a maximum in the center of the shadow area, which is caused by the fact that the decoated or stripped optical fiber end FE1 acts like a cylindrical lens. Towards the other edge of the shadow area SF1, a drop of intensity occurs, again symmetrically After leaving the shadow area SF1, the intensity IV1, again, increases abruptly at a flank F2 to the original value.

This means that the maximum IVM1 in the area of D corresponds exactly to the middle or the longitudinal axis of the optical fiber end FE1. Thus, it is possible, via the evaluation of the maximum IVM1 of the intensity curve IV1, to determine the position of the longitudinal axis of the optical fiber end FE1. In the same manner, the maximum IVM2 of the intensity curve IV2 will determine the position of the longitudinal axis of the optical fiber end FE2 from the shadow area SF2. The offset of the two maxima IVM1 and IVM2 against one another is proportional to the offset dx of the longitudinal axis of the two light waveguide ends FE1 and FE2 in the x direction. This means a displacement of one of the optical fibers, for example the fiber end FE2, must merely be performed until the offset or displacement dx of the longitudinal axes has vanished, whereby a true alignment of the optical fibers is achieved in the measured plane. This alignment can be performed by an operator based on observation of the two intensity distributions IV1 and IV2 on the display device DPL, or, automatically, by the formation of the difference d in a computer COM and the deviation of a control signal for the actuation of the holding device HR2 via the control unit CTU.

Let it be mentioned that, in the present example, the scanning device SCD has been shown merely schematically for a better demonstration of the process of the method. Details about the evaluation can be found in FIGS. 9-11.

In the advantageous manner of a cross-correlation that is still to be described in more detail, the intensity distributions IV1 and IV2 are subjected to the computer COM, whereby an adjustment signal is generated, which, via the control device CTU, performs the displacement of the holding device HR2 in the x direction, namely until the offset dx has vanished.

If a displacement in the y direction is also desired and a two-dimensional adjustment is to occur, one can operate according to the embodiment of the device in FIG. 2. As far as the light sources in the evaluation units are concerned, they exist in a double fashion, with a light source LQ and a light source LQ*, and, likewise, on the evaluation side, the corresponding scanning devices SCD and SCD* for the shadow pictures SF1 and SF2, as well as SF1* and SF2*. The evaluation signal of the two planes residing perpendicular relative to one another in separate computers will occur with the computers COMX and COMY.

Via the corresponding control lines SMX and SMY, the holding element HR2 is moved in both the x and y direction until the true alignment of the fiber ends FE1 and FE2 is reached in both planes.

In order to prevent the two light sources and two scanning devices, such as video cameras, from becoming necessary, it is sufficient to fashion the base plate GP so that it can be turned by 90° so that, first, the deviation in the x direction is determined in the manner shown with regard to FIG. 1 utilizing the light source LQ and the scanning device SC. After the alignment in the x direction, wherein dx=0, the base plate GP, together with the optical fiber ends FE1 and FE2, are rotated through 90° on the z axis. Then, the positioning device PE lies such that the lateral offset in the y direction, i.e. dy, is determined by the light source LQ. Subsequently, adjustment in the direction occurs so that this deviation vanishes also.

Immediately after the fiber ends FE1 and FE2 have been placed in the holding devices, the operator roughly aligns them in the z direction with the assistance of two lines on the video screen, which reside symmetrically to the lines SB at a distance of approximately 1 mm. Thus, a small gap remains between the two end faces. Subsequently, the offset dx is determined in both halves and largely aligned Afterwards, as schematically illustrated in FIG. 12, a row in the z direction is selected and read-out by the arrow SC12 and the intensity distribution IVZ is determined by means of the scanning device SCD, whereby a distinctive maxima occurs in the gap region dz. From that, one can determine the exact position and size of the gap between the end faces of the fiber ends FE1 and FE2. Then, one ca possibly, again, scan two columns in a defined distance transversely relative to the longitudinal axes LA1 and LA2 and, thus, it is possible to perform a fine alignment in the x direction from the intensity distribution of these two columns.

Whereas in the case of FIG. 1 it is assumed that the shadow image SF1 and SF2 of the contour of the fiber ends FE1 and FE2 is scanned and used for the evaluation, it is also possible to use an image of the reflected light, which is generated by the fiber ends operating as cylindrical lenses for the evaluation. Both possibilities are shown in FIG. 3 in a schematic illustration wherein a view directed along the longitudinal axis of the fiber is selected The light beam LE, drawn as through-lines, corresponds to the evaluation of the shadow picture of FIG. 1, since the light goes through the fiber ends FE1 and FE2 here and falls onto a plane SCD to be scanned by the scanning device SCD.

The light portion marked in dashed lines, however, must be attributed to the light reflected at the fiber ends FE1 and FE2, whereby this light portion is guided via a lens LSR2 and reaches an evaluation unit SCDR which operates analogly to the scanning device SCD according to FIG. 1. Otherwise, further evaluation of the intensity distribution can be performed analogously to the arrangement according to FIG. 1.

However, with the light directed on the glass cylinder composed of the fiber ends, the reflected light, must have a maximum of intensity, which is reflected at the circular arc piece. The corresponding optical devices bundle the strongly divergent, reflected light. Scattered light portions then lead to disturbances if they lead to any inhomogenious intensity distribution in a direction to the fiber axes on the imaging sensor.

As it was explained in connection with FIG. 1, the automized operation and the automized alignment of the optical fibers FE1 and FE2 face the task of determining the difference dx between the longitudinal axes and to derive a manipulated variable therefrom. Details in this respect are explained with FIGS. 4-7, wherein only the intensity regions IV1 and IV2 are illustrated, and these lie on both sides of the maximum IVM1 or IVM2, which means that region which is caused by the function of the optical fiber as a cylindrical lens. As will be described in more detail in the corresponding digitalized storage, the $i=0$ to $i=N-1$ recorded N scanning values from one or several scanning events exists corresponding to the arrows SC1 and SC2 in FIG. 1. The suppression of the high lateral shoulders or flanks F1 and F2 of the intensity curve in FIG. 1 which is generated by light passing by the optical fiber ends FE1 and FE2 can occur in a simple manner in that the values of the intensity are admitted only after the first step edge drop F1 has occurred and in that, also, those values which then occur after the second edge rise F2 are again suppressed. It is also possible to use the steep drop or rise F1 and F2 at the fiber edges directly for the determination of the misalignment. Such a steep edge can actually be determined easier than the maximum, as in the case of IVM1 and IVM2.

If only the information of the picture points at the upper and lower edges of the fiber picture used when positioning the fiber ends according to their outside diameter, dirt, fiber breakouts or such at these locations in the control loop act as disturbing variables. Generally, these cooperate with electrical disturbing influences during the evaluation of the video picture and, thus, result in a mispositioning or misalignment in the video picture, depending on the intensity and size of the bad spot and possibly result in higher splicing attenuations.

If, for the calculation of the cross correlation function, the edges are considered as well, an increase of the accuracy when determining dx would even be conceivable given the exclusion of the disturbances on the fiber surface. The higher number of measured values, however, particularly lead to a considerably longer calculating time.

Figure 4:
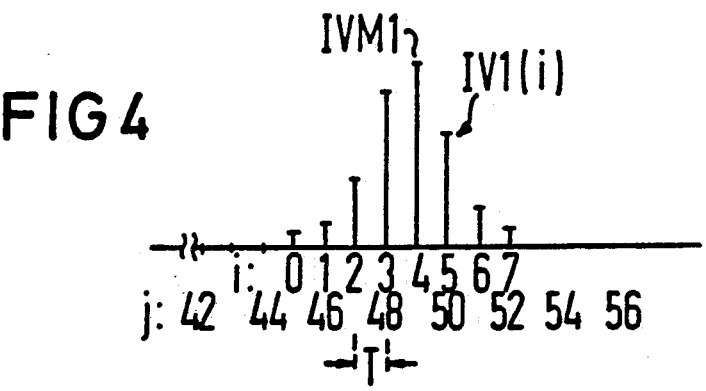
FIG. 4 is a graph showing the intensity distribution of one end of a light waveguide of a pair of light waveguides.
Figure 5:
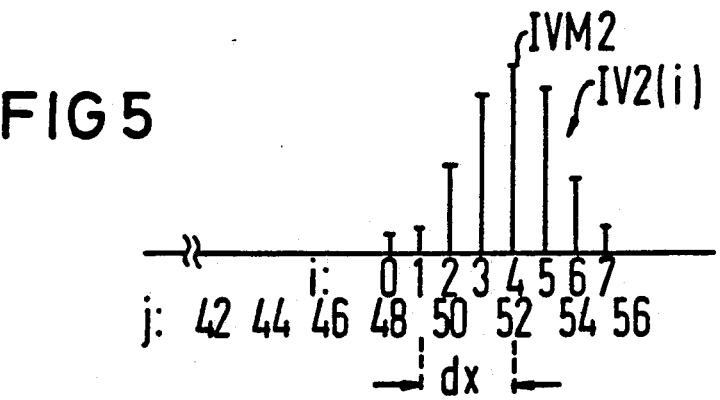
FIG. 5 is a graph illustrating the intensity distribution of the other end of the pair of light waveguide ends.

The distance of the quantisized maxima IVM1 and IVM2 of FIGS. 4 and 5 is 3 column widths or scanning steps. With these values, one could already perform an approximate alignment. The accuracy can be increased considerably by means of the cross-correlation.

Figure 6:
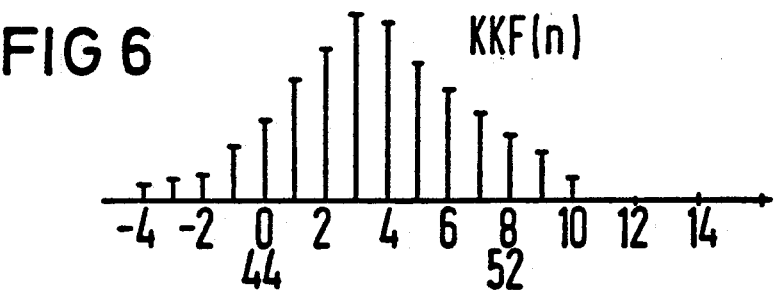
FIG. 6 is a graph illustrating the appertaining cross-correlation function.

The discrete values or column elements of the intensity distribution of IVM1, illustrated in FIG. 4, and IVM2, illustrated in FIG. 5, of the fiber shadows SF1 and SF2 are subject to a cross-correlation function (KKF), which is formed by the equation:

$$KKF(n) \text{ of } IV1(i) \text{ and } IV2(i).$$

wherein N is the number of column elements; n is the n-th value and, as illustrated in FIG. 6, $n = -4 \ldots +10$. Given N-column elements for the radial offset dx between the axes of the beam waveguide ends FE1 and FE2 applies according to:

$$dx = n[Max\ (KKF(n))] \qquad (1)$$

In the example, n Max(KKF(n)) is the third value at which the function KKF(n) becomes maximal.

Max (KKF(n)) is the maximal value of the cross-correlation function and n[Max (KKF(n))] the appertaining location. The cross-correlation function KKF(n) of the function IV1 (i) and IV2 (i) is defined by:

$$KKF(n) = T \sum_{i=0}^{N-1} IV1(i) \cdot IV2(n+i) \qquad (2)$$

wherein T is the distance between two adjacent intensity values. The practical interest is to approximate the discrete function KKF(n) by the function dependency, for example a polynomial interpolation, since the resolution of dx is limited by the distance of two intensity values. If KKF is the function dependency, then $$dx = n[Max\ (KKF)] \qquad (3).$$

The computed is converted by a microcomputer CPU in a known manner into suitable signals for driving a servo component at the fiber holding device FH1. Disturbance variables, for example hysteresis, deviation play or such, of the servo component can be minimized by the iterative approach to the optimal position.

The cross-correlation function KKF(n) is shown in FIG. 6, namely for the specific example with N=8, as specified under the respective abscissa of FIGS. 4 and 5, j stands for the absolute column number, for example in counting the incremental steps, starting with the scanning event corresponding to SC1 and SC2 in FIG. 1 at one end of the picture edge, and going to the other one. In the present example, it is assumed that the entire determined region lies between the column numbers 42 and 56, whereas for the cross-correlation function, the column numbers 44–52 are used (N=8) As can be seen in FIGS. 4 and 5, dx is the distance between two maxima IVM1 and IVM2.

Figure 7:
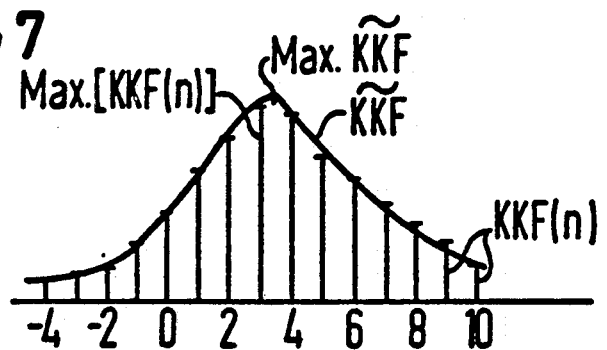
FIG. 7 is a graph showing the functional dependency of the cross-correlation function of the appertaining maxima.

FIG. 7 shows a functional dependency KKF of KKF(n) and the appertaining maxima. In the example the lateral offset dx to be compensated is approximately 3.4 relative units with T=1. Expediently, the discrete cross-correlation KKF(n) is brought closer to KKF by a functional dependency due to the limited resolution of dx by the value distance T. In the example, it is suggested to proceed according to the popular method of small squares. Formally, this means to solve the equation:

$$\rho = \sum_{n=0}^{N-1} [(KKF(n) - KKF(n))]^2$$

wherein $\rho$ is a minimum. Therefore, KKF can clearly be determined from KKF(n). KKF(n) is the function of KKF computed for the value n.

FIG. 8 shows two fiber ends FE1 and FE2 in a strongly enlarged fashion, wherein, additionally, they have an angle error between their longitudinal axes LA1 and LA2. If, at the fiber end FE1 or, respectively, in its shadow, two scannings corresponding to the arrows SC1 in FIG. 2 are performed, namely at a distance a, the relationship $\phi = \arctan\ d\phi/a$ applies for the two columns SP1 and SP3 and the angle error $\phi$. Thereby, $d\phi$ is the offset that results from the distance a between successive columns SP1 and SP2.

If the value $\phi$ surpasses a defined value, e.g. $\phi$max, the positioning event is interrupted with an error message, as well as the splicing event. At least one of the fiber ends must then be removed and reinserted into its holder.

Figure 9:
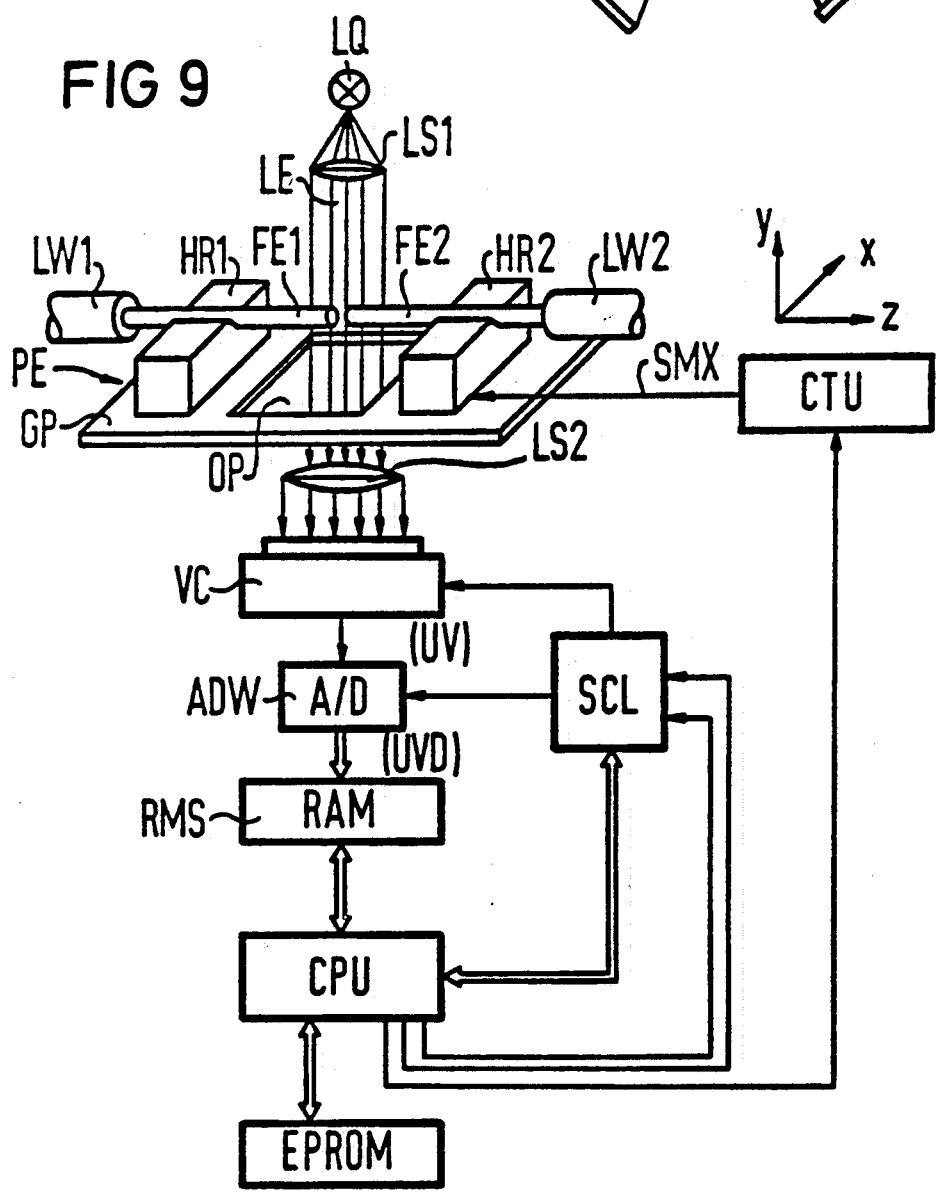
FIG. 9 is a perspective view of a schematic illustration of a device having block diagrams of the structure of an evaluation unit for the implementation of the method of the present invention.

In the simplified and schematic illustration, the arrangement according to FIG. 9 shows the structure according to FIG. 1 with the block diagram of the different control- and evaluation components. Below the base plate GP in the region of the opening OP, a video camera VC is provided which scans a picture corresponding to the arrows SC1 and SC2 of FIG. 1, which picture falls on the sensor of the camera VC in the x direction, line-by-line. Thus, an analog video signal UV is developed and, as illustrated in FIG. 10, is dependent on the time t.

FIG. 11 shows the scanning namely in the standard manner with a succession of fields, whereby the dashed lines represent the first field and solid lines represent a second field. Due to this scanning event, an analog signal UV corresponding to FIG. 10 occurs and the incisions or breaks HB1, HB2 and HB3, respectively, mark the end of a row of a field. As shown in the right part of FIG. 10, the individual scanning samples are taken out of the thus obtained analog signal via a scanning and holding circuit (corresponding to the amplitude values according to FIG. 4 or FIG. 5). The thus obtained analog signal samples of UV are supplied to an A/D-converter ADW and the individual scanning samples of the digitalized video signal UVD, which will correspond to the quantisized values of FIGS. 4 and 5, are memorized in successive fashion in a RAM-memory RMS. The memory RMS is a write-read memory which contains the data of the digitalized video signals, namely corresponding to the scanning values of FIGS. 4 and 5.

The memory unit RMS is connected with the computer unit CPU of the evaluation equipment which, in turn, is driven by an EPROM, which contains the measuring event as a command, for example the program for the control of the entire proceedings and for the evaluation of the data. For all scanning events, this is always the same, given successive splicing events.

The computing- and control unit CPU starts the entire event and puts out in a successive fashion the numbers (j) of the individual columns in which the scanning is performed, namely at first, to a synchronization- and control logic SCL. This synchronization- and control logic SCL starts the A/D-converter at the beginning of the scanning event and also starts the beginning of the actual scanning event of the video camera VC. In this way, the scanning value in the x direction are written in the memory RMS column-by-column. Thus, after the end of the scanning event, i.e., when the digitalized value of the functions according to FIGS. 4 and 5 exist subsequently, the cross-correlation corresponding to FIGS. 6 or 7 and the computing unit CPU is performed. Based on this result, the control unit CPU drives the hold device HR2 with the aim that an optimally accurate alignment (dx=0) is performed.

A field developing during a scanning, such as illustrated in FIG. 11, thereby only contains the odd rows, whereas the second field represents the even rows. The number of rows are standardized (CCITT or NTSC), the information of the row is respectively divided into n-columns and the picture information is illustrated as a matrix with n-rows and j-columns The result of one single row with n-columns is shown by FIGS. 4 and 5. Each one of the scanning values shown in FIGS. 4 and 5 represents the intensity value in a certain narrow, limited spot, for example a size of 0.001 mm×0.001 mm of the entire surface.

The computing unit CPU determines the row or column to be digitalized and informs the synchronization- and control logic SCL whether a row or a column is to be digitalized. Furthermore, it provides information whether the first or the second, etc., field is digitalized, and also transmits the number of the respective row or column.

The synchronization- and control logic SCL then starts the j-columns or n-rows at the right time and, furthermore, gets the A/D conversion started. After that, for example at the end of the measuring event, the digitalized value of the row or the column exists in the memory unit RMS and can be correspondingly evaluated by the CPU, namely according to the cross-correlation function corresponding to FIGS. 6 and 7.

It is useful to minimize disturbing variables, such as hysteresis, deviation play or such, in connection with the adjustment elements by repeating the positioning even in the sense of an iterative approach for the optimal fiber position.

It is also possible to perform an imaging of the fiber ends in the x direction and y direction above one another on the picture sensor via beam deflection, whereby, respectively, one column contains the intensity distribution of, respectively, one fiber end in the x direction and, additionally, in the y direction. Both intensity distributions are cross-correlated with the appertaining intensity distribution of the opposite fiber in the computer in a successive fashion.

It is useful if, after the alignment of the fiber ends FE1 and FE2, a splicing event is performed in at least one direction, preferably in the form of a welding event, and that after the termination of the splicing event, the scanning event is repeated and a possibly remaining offset or angle error is used for the assessment of the quality of the spliced connection and is correspondingly indicated. In the case of multiple splicing devices, a lateral offset and possibly an angle error is computed for each joined fiber couple. Expediently, the intensity distribution is determined optimally close to the face ends SF1 and SF2 of the fiber ends.

Often it is advantageous if several scannings for the determination of the intensity distribution are performed at the same location (z=constant) of the longitudinal axes LA1 and LA2 of the fiber ends FE1 and FE2. It is also possible to perform several scannings for the determination of the intensity distribution at various locations (z=not constant) of the longitudinal axes LA1 and LA2 of the fiber ends FE1 and FE2.

Although various minor modifications may be suggested by those versed in the art, it should be understood that we wish to embody within the scope of the patent granted hereon all such modifications as reasonably and properly come within the scope of our contribution to the art.

We claim:

1. In a method for the true alignment of two fiber ends, which includes illuminating the fiber ends to generate a picture of the fiber ends, and then scanning the picture with a sensor of a video camera, the improvements comprising the step of scanning includes scanning each of the fiber ends at least once transversely relative to the longitudinal axis to form a row, said step of illuminating being performed with the fiber ends acting as cylindrical lenses to create a maximum intensity for the center of the fibers, determining the intensity distribution separately for the imaging of each fiber end and determining the position of the respective longitudinal axis of the fiber and a mutual lateral offset between the fibers by using the intensity distribution and then adjusting the ends of the fiber based on the determined offset, said step of determining the intensity distribution including determining every row's discrete intensity values column-by-column and recording these values in a memory unit, said intensity distribution, wherein quantisized in columns and obtained for both fiber ends line-by-line, being made available for the evaluation for both fiber ends separately and in that from the difference in the columnwise position of the intensity distribution of the two fiber ends, the alignment error is determined and the post-adjustment of at least one fiber end for a true alignment is performed.

2. In a method according to claim 1, wherein illuminating is with white light.

3. In a method according to claim 2, wherein the light is passed through the fiber ends and the shadow picture of the fiber ends is scanned for its intensity and used for the evaluation.

4. In a method according to claim 1, wherein the light is reflected by a surface of the fiber ends used for the evaluation.

5. In a method according to claim 1, wherein the step of illuminated the fiber ends is performed by utilizing a halogen lamp.

6. In a method according to claim 1, wherein the illuminating of the fiber ends is performed with a luminous diode.

7. In a method according to claim 1, wherein the illuminating of the fiber ends is performed with a junction laser.

8. In a method according to claim 1, wherein the two separate intensity distributions obtained from the two fiber ends are subjected to a cross-correlation.

9. In a method according to claim 8, wherein the discrete cross-correlation function is approximated by a functional dependency.

10. In a method according to claim 1, wherein the step of scanning includes two crosswise scannings being offset relative to each other in a direction of a longitudinal axis of the fiber and evaluating said scannings so that an angle error is recognized depending on the fiber end.

11. In a method according to claim 1, which includes minimizing disturbing variables like hysteresis, deviation play and such, in connection with the adjustment element by repeating the positioning event in the sense of an iterative approach to the optimal fiber position.

12. In a method according to claim 1, wherein, subsequent to the aligning of the fiber ends in at least one direction, splicing the ends together to form a splice connection, and subsequent to the splicing, repeating the scanning and determining steps to determine possible remaining lateral offset and angle error for use to assess the quality of the splice connection.

13. In a method according to claim 12, wherein, in the case of multiple-splice connection of multiple pairs, a lateral offset and an angle error is computed for each splice connection of the fiber pairs.

14. In a method according to claim 1, wherein the step of determining the intensity distribution is determined as close to the end face of the fiber as possible.

15. In a method according to claim 1, wherein several scannings for the determination of the intensity distribution are performed at the same location with displacement along the fiber axis being zero.

16. In a method according to claim 1, wherein several scannings for the determination of the intensity distribution are performed at different locations along the axis of the fiber end.

17. In a method for the true alignment of two fiber ends, which includes illuminating the fiber ends to generate a picture of the fiber ends, and then scanning the picture with a sensor of a video camera, the improvements comprising the step of illuminating being performed with the fiber ends acting as cylindrical lenses to create a maximum intensity for the center of the fibers, determining the intensity distribution separately for the imaging of each fiber end and determining the position of the respective longitudinal axis of the fiber and a mutual lateral offset between the fibers by using the intensity distribution and then adjusting the ends of the fiber based on the determined offset, said method including a second evaluation alignment of the fiber ends in a plane extending perpendicular relative to the first observation plane which includes scanning, determining the intensity distribution to determine the offset between the ends and adjusting the offset so that the fiber ends are adjusted relative to each other in two perpendicular directions.

18. In a method according to claim 17, wherein each of the scanning steps includes deflecting the imaging of the fiber ends in the desired direction, recording the intensity distribution respectively of one fiber end in both an x direction and the y direction, that both intensity distributions are cross-correlated with the appertaining intensity distribution of the opposite fiber and a computing unit in successive fashion.

19. In a method for the true alignment of two fiber ends, which includes illuminating the fiber ends to generate a picture of the fiber ends, and then scanning the picture with a sensor of a video camera, the improvements comprising the step of illuminating being performed with the fiber ends acting as cylindrical lenses to create a maximum intensity for the center of the fibers, determining the intensity distribution separately for the imaging of each fiber end and determining the position of the respective longitudinal axis of the fiber and a mutual lateral offset between the fibers by using the intensity distribution and then adjusting the ends of the fiber based on the determined offset, said method further including scanning of the image of the light waveguide ends along the direction of the longitudinal axis, obtaining the intensity distribution and utilizing said distribution to determine the size of the gap using this information in moving the fiber ends in the post-adjustment from the fiber ends when forming a splice connection.

* * * * *